US012614868B2

(12) United States Patent
R S et al.

(10) Patent No.: US 12,614,868 B2
(45) Date of Patent: Apr. 28, 2026

(54) CONTACT ELEMENT, ELECTRICAL CONNECTOR AND ELECTRICAL CONNECTOR ASSEMBLY

(71) Applicants: TE Connectivity India Private Limited, Bangalore (IN); Tyco Electronics France SAS, Pontoise (FR)

(72) Inventors: Rakesh R S, Bangalore (IN); Sundareshan M D, Pontoise (FR); Xavier Rouillard, Pontoise (FR)

(73) Assignees: TE Connectivity India Private Limited, Bangalore (IN); TE Connectivity Solutions GmbH, Schaffhausen (CH)

( * ) Notice: Subject to any disclaimer, the term of this patent is extended or adjusted under 35 U.S.C. 154(b) by 394 days.

(21) Appl. No.: 18/110,930

(22) Filed: Feb. 17, 2023

(65) Prior Publication Data

US 2023/0261407 A1 Aug. 17, 2023

(30) Foreign Application Priority Data

Feb. 17, 2022 (EP) .................................... 22157333

(51) Int. Cl.
*H01R 13/11* (2006.01)
*H01R 13/40* (2006.01)

(52) U.S. Cl.
CPC ............. *H01R 13/11* (2013.01); *H01R 13/40* (2013.01)

(58) Field of Classification Search
CPC ........ H01R 13/11; H01R 13/40; H01R 13/41; H01R 9/00; H01R 9/053; H01R 12/00; H01R 13/02; H01R 13/2407; H01R 13/26; H01R 13/113; H01R 13/24; H01R 13/2442; H01R 13/2457; H01R 13/46; H01R 13/629; H01R 13/631
See application file for complete search history.

(56) References Cited

U.S. PATENT DOCUMENTS 4,299,436 A * 11/1981 Ackerman ............ H01R 12/55 439/853
4,790,779 A * 12/1988 Billman ............... H05K 7/1038 439/842
(Continued)

FOREIGN PATENT DOCUMENTS

CN 203932406 U 11/2014
DE 10156233 A1 3/2003
(Continued)

OTHER PUBLICATIONS

English Translation of DE 102016104868 (Year: 2025).*
(Continued)

*Primary Examiner* — Tulsidas C Patel
*Assistant Examiner* — Carlos E Lopez-Pagan
(74) *Attorney, Agent, or Firm* — Barley Snyder

(57) ABSTRACT

A contact element includes a frame and a contact spring fixed to the frame. The frame has a first region and a second region opposite the first region. The second region is spaced apart from the first region by a gap. The contact spring has a fixed end fixed to the first region of the frame and a free end opposite the fixed end. The contact spring extends from the first region across the gap to the second region. The free end of the contact spring overlaps the second region.

19 Claims, 3 Drawing Sheets

(56) References Cited

U.S. PATENT DOCUMENTS

| | | | | | |
|---|---|---|---|---|---|
| 5,573,434 | A * | 11/1996 | Ittah | H01R 13/113 | 439/839 |
| 6,299,492 | B1 | 10/2001 | Pierini et al. | | |
| 6,616,485 | B2 * | 9/2003 | Harasawa | H01R 13/2442 | 439/862 |
| 7,766,668 | B1 * | 8/2010 | Bishop | H01R 12/718 | 439/66 |
| 9,660,367 | B2 * | 5/2017 | Yu | H01R 12/7076 | |
| 9,793,620 | B2 | 10/2017 | Marsh et al. | | |
| 2002/0187666 | A1 * | 12/2002 | Harasawa | H01R 13/2442 | 439/74 |
| 2006/0014405 | A1 * | 1/2006 | Chen | H01R 13/6315 | 439/78 |
| 2015/0004850 | A1 | 1/2015 | Tsuji et al. | | |
| 2019/0148872 | A1 * | 5/2019 | Lin | H01R 13/113 | 439/701 |

FOREIGN PATENT DOCUMENTS

| | | | |
|---|---|---|---|
| DE | 102016104868 | B3 * | 5/2017 |
| EP | 0674358 | A1 | 9/1995 |
| EP | 3783744 | A1 | 8/2019 |
| JP | 2002367697 | A | 12/2002 |
| JP | 2015011841 | A | 1/2015 |
| JP | 2017054808 | A | 3/2017 |
| JP | 2017513206 | A | 5/2017 |
| WO | 2004001906 | A1 | 12/2003 |
| WO | 2017102764 | A1 | 6/2017 |

OTHER PUBLICATIONS

Notice of Reasons for Refusal dated Apr. 16, 2024 with English translation, corresponding to Application No. 2023-020490, 12 pages.

Indian Examination Report dated Jun. 13, 2024, corresponding to Application No. 202344009734, 5 pages.

Korean Office Action dated Jun. 19, 2024 with English translation, corresponding to Application No. 10-2023-0020011, 11 pages.

Extended European Search Report, Application No. 22157333.0-1201, Dated: Jul. 19, 2022, 8 pages.

European Patent Office Examination Report dated Jun. 10, 2025, corresponding to Application No. 22157333.0-1201, 6 pages.

* cited by examiner

CONTACT ELEMENT, ELECTRICAL CONNECTOR AND ELECTRICAL CONNECTOR ASSEMBLY

CROSS-REFERENCE TO RELATED APPLICATIONS

This application claims the benefit of the filing date under 35 U.S.C. § 119(a)-(d) of European Patent Application No. 22157333.0, filed on Feb. 17, 2022.

FIELD OF THE INVENTION

The invention relates to a contact element, an electrical connector for providing an electric connection with a mating connector, and an electrical connector assembly.

BACKGROUND

Contact elements, electrical connectors and electrical connector assemblies are commonly mass produced. There is a need to simplify these elements, while their versatility is maintained or even increased. There is also the need to simplify their production in order to reduce production costs.

SUMMARY

A contact element includes a frame and a contact spring fixed to the frame. The frame has a first region and a second region opposite the first region. The second region is spaced apart from the first region by a gap. The contact spring has a fixed end fixed to the first region of the frame and a free end opposite the fixed end. The contact spring extends from the first region across the gap to the second region. The free end of the contact spring overlaps the second region.

BRIEF DESCRIPTION OF THE DRAWINGS

The invention and its advantages will be explained in more detail below, by way of embodiments and by referring to the following accompanying figures, wherein.

DETAILED DESCRIPTION OF THE EMBODIMENT(S)

Figure 1:
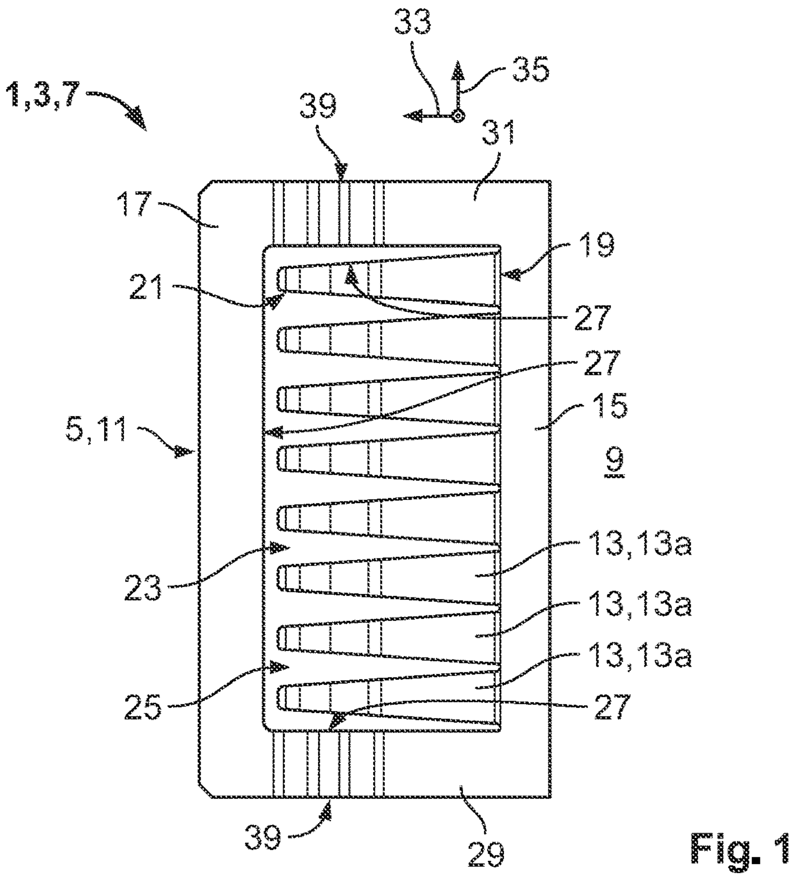
FIG. 1 is a plan view of a contact element according to an embodiment.

In the following, the contact element, the electrical connector and the electrical connector assembly are explained in detail by the accompanying figures. In the figures, specific embodiments are exemplarily shown. These embodiments are not intended to limit the scope of the present disclosure. In the detailed description, the same features and features having the same technical effect are referred to by the same reference numeral. Repetitive descriptions are avoided, whereas differences between the embodiments shown in the figures are explicitly mentioned.

The features described below may be arbitrarily combined with one another and individual features may be omitted if the technical effect obtained by the omitted feature is not relevant. Each of the possible embodiments described in the following represents a specific combination of technical features and may be advantageous on its own. Features described by the contact element may be provided in the electrical connector or the electrical connector assembly and vice versa.

FIG. 1 depicts a contact element 1 in a pre-assembly state 3. The contact element 1 is a sheet-metal part 7 made of a sheet metal 5. The contact elements 1 may be produced by bending and stamping that may require one single production step and the advantage of a reduced amount of cut waste of the sheet material 7 because of the improved geometry and/or shape of the contact element 1.

The contact element 1 is shown in a top view and is located in a plane 9. Plane 9 corresponds to the drawing plane. Contact element 1 comprises a frame 11 and contact springs 13. Plane 9 is spanned by a length direction 33 and a width direction 35. In the pre-assembly state 3 the entire contact element 1 is located in plane 9. A height direction 37 extends out of the drawing plane and is oriented perpendicular to plane 9.

In the specific embodiment shown in FIG. 1, an overall number of eight contact springs 13 is provided. In different embodiments of the contact element 1 any number of contact springs 13 may be provided, e.g. one, two, three or a plurality thereof. Each of the contact springs 13, respectively the at least one contact spring 13 may be referred to as lamella 13*a* or—when two or more contact springs 13 are provided—a plurality of lamellae 13*a*.

In the embodiment shown, the plurality of contact springs 13 each have the same shape and geometry, e.g. length. In other embodiments, the contact springs 13 may differ from one another in shape and/or geometry.

In the specific embodiment shown, frame 11 comprises a first region 15 and a second region 17 that is arranged opposite the first region 15. The first region 15 is spaced apart from the second region 17 by a gap 23. Frame 11 further comprises a third region 29 and a fourth region 31. Each of the first 15, the second 17, the third 29 and the fourth region 31 is located at one side of the gap 23. All four regions 15, 17, 29, 31 encircle the gap 23. The first and the second region 15, 17 as well as the gap 23 may be located in a common plane.

Contact element 1 has a rectangular shape or footprint. The shape or footprint may be different in other embodiments, e.g. square-shaped, curved, circular, etc. Accordingly, in embodiments having curved or circular regions of the frame 11 in particular, the contact springs 13 may differ in shape and/or geometry, in particular their length. Corners of the contact element 1 may provide a bevel. The contact element 1 may have a squared shape or may even comprise curved regions. Exemplarily, the contact element 1 may have a circular or elliptic footprint or a footprint similar to a circle or an ellipse, wherein the first and the second region 15, 17 are semicircle shaped or semi-elliptic shaped and each of the contact springs 13 may have a different length and/or shape.

In a different embodiment only the third region 29 may be provided. In this case, the gap 23 opens towards outside the frame 11 opposite the third region 29. In the case of a stamped sheet metal part 7, the gap 23 is produced by stamping a hole 25 in the sheet metal 5. In the embodiment shown, hole 25 is formed by inner sides 27 of the second region 17, the third region 29 and the fourth region 31 and by an outer contour of the contact springs 13. The at least one contact spring 13 may be formed from the material of the gap 23, thereby reducing the amount of cut waste and thus production costs.

The at least one contact spring 13 has a fixed end 19 which is fixed to the first region 17 of frame 11. Opposite the fixed end 19, the at least one contact spring 13 has a free end 21. The contact springs 13 extend from the first region 15 to the second region 17 across the gap 23. In the pre-assembly state 3, the free end 21 is located within the gap 23.

In the embodiment shown, the third region 29 and the fourth region 31 comprise a bending portion 39 that is adapted to be bent as will be shown in the following figures.

It is to be noted that the contact spring 13 also comprises bending portions 39.

Figure 2:
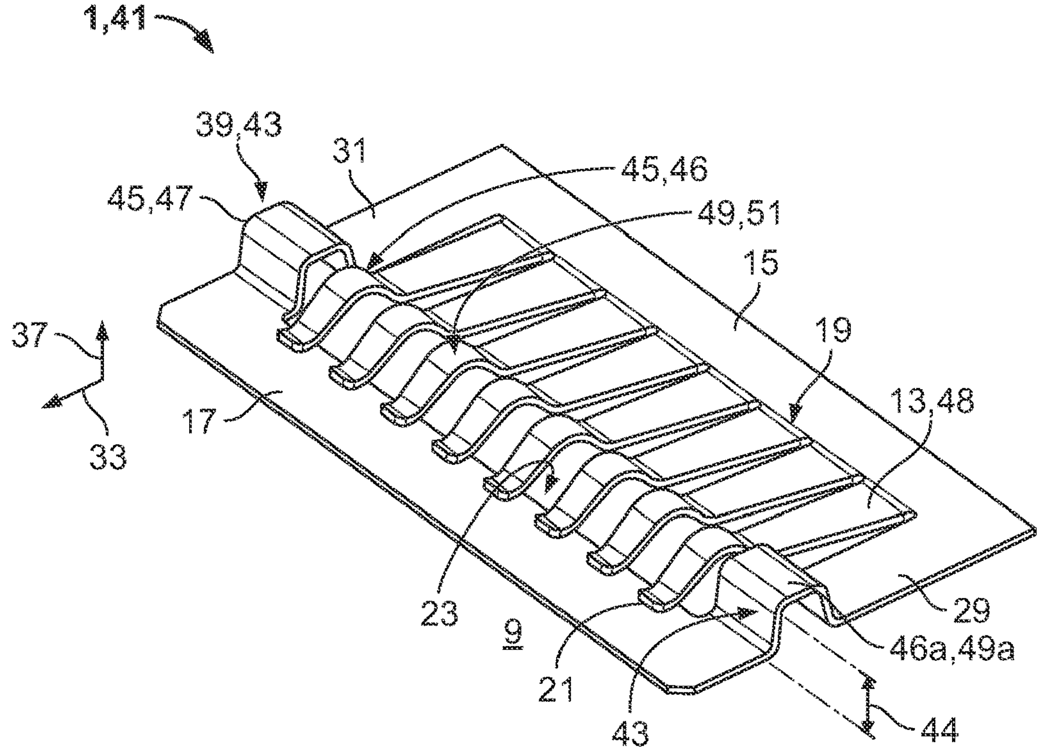
FIG. 2 is a perspective view of the contact element in an assembly state.

In FIG. 2, the contact element 1 is shown in the bent or assembly-state 41. In the assembly-state 41, each of the contact springs 13 is a bent upwards, i.e. in the height direction 37 and extends in an acute angle out of plane 9.

The first region 15 and the second region 17 are still located in plane 9, whereas the third region 29 and the fourth region 31 are only partially located in plane 9.

The bending portion 39 of FIG. 1 is bent upwards out of plane 9, i.e. in the height direction 37 and subsequently bent downwards and bent back into plane 9. The bending portion 39 thus forms a bight 43. The bight 43 comprises a U-shaped section 45 in the embodiment shown and is a shortening fold 47. The U-shaped section 45 is a curved portion 46. The bight 43 may comprise or consist of a form such as a bulge, an indentation, a protrusion or a convexity. In a different embodiment, the bight 43 may comprise or consists of a folded section, e.g. comprising one or more V-shaped sections. The bight 43 may comprise a plateau that is oriented essentially parallel to the plane in which the frame is located.

Two bights 43 are provided that are located opposite to one another, wherein gap 23 is located between the bights 43. The third region 29 may at least, sectionwise or in its entirety, deviate from the straight line that connects its two end points, at which the third region 29 is connected to first and second region 15, 17.

The bight 43 has the effect of a shortening of the third region 29 and the fourth region 31 along the length direction 33. The bights 43 have the effect that each of the contact springs 13 overlaps the second region 17 with the corresponding free end 21. As an alternative to lengthening the contact spring 13, the third region 29 is shortened by the bight 43, having the same effect of providing the overlap without reducing integral strength of the at least one contact spring 13. As an example, as the lengthening of the at least one contact spring 13 is avoided, the material thickness of the at least one contact spring 13 may remain constant.

Non-limiting exemplary ways to generate the overlap of the free end 21 and the second region 17 are processes like rolling, swaging or pressing of the at least one contact spring 13, such that the at least one contact spring 13 is configured to be lengthened. These production steps may be applied to the at least one contact spring 13 during the stamping process. The bight 43 may be formed by a plastically deformed section of the frame 11, in particular a section of the third region or fourth region 29, 31, respectively.

The bight 43 may extend in a direction along which the at least one contact spring 13 is configured to be elastically deflectable. The bight 43 may protect the at least one contact spring 13 from being damaged by mechanical influences. The bight 43 may thus extend out of the plane 9 of the frame 11. The bight 43 may protect the at least one contact spring 13 at least partially from one, two, three or four sides. In a further embodiment of the contact element 1, the bight 43 may extend over a part of the third region 29 and may be located closer to the second region 17 than to the first region 15.

The position of the bight 43 has the advantage that it is adapted to the deflection geometry of the at least one contact spring 13. The bight 43 may represent a bending region of the frame 11, such that the position at which a contact force is generated by the at least one contact spring 13 is located close to the position of the bight 43. If the position of the exertion of contact force is located distal from the position of the bight 43, a part of the third region 29 may act as a lever that increases the forces applied to the third region 29.

Contact springs 13 are oriented essentially parallel to one another. Each contact spring 13 may be deflected elastically from a rest position 48 in a direction towards the gap 23, i.e. opposite the height direction 37. The contact springs 13 also comprise at least one curved portion 46 and an apex 49. To distinguish the elements, the curved portion 46 and the apex 49 of the bight 43 may be referred to as further curved portion 46*a* and further apex 49*a*.

If the contact spring 13 is deflected from the rest position 48 towards the gap 23, the contact spring 13 rests against the second region 17 of the frame 11 with the corresponding free end 21. The second region 17 supports the deflected at least one contact spring 13, thereby increasing a contact force 63, shown in FIG. 3, that may be provided by the contact element 1. The contact force 63 may be understood as the force that may be exerted by a deflected contact spring 13 against a mating contact element 55.

Each contact spring 13 comprises a plurality of U-shaped sections 45 (see also FIG. 3), such that an apex 49 is formed. The apex 49 represents the highest point of each contact spring 13 and corresponds to a contact point 51 of the corresponding contact spring 13. The apex 49 may be located closer to the free end 21 of the at least one contact spring 13 than to the fixed end 19 of the contact spring 13. The contact spring 13 may have at least one convex portion of different possible shapes, e.g. U-shape or V-shape. The contact spring 13 may comprise one or more U- or V-shaped sections or a combination thereof. The contact spring 13 may, in particular, be convex.

Each contact spring 13 may be deflected individually, whereas an electrical contact with a mating contact (see FIGS. 3 and 4) is established by the plurality of contact springs 13. The contact element 1 allows for a reliable electrical connection even if the mating contact does not have an even contact surface.

In the case of such an uneven contact surface, each of the contact springs 13 may be deflected by a deflection distance 53 (see FIG. 3) that may be different for each contact spring 13. The possibility of contacting an uneven mating contact without deterioration of the electrical connection is one of the advantages of said contact element 1 having a multitude of contact springs 13.

The bights 43 are further configured to protect the contact springs 13. The contact spring 13 are, for instance, not accessible from the sides, in particular from the third region 29 or the fourth region 31. In addition, the bights 43 protect the contact springs 13 to a certain amount against mechanical influences acting opposite the height direction 37. In the embodiment shown, the bights 43 have a bight height 44, shown in FIG. 2, located further away from plane 9 then the apex 49 of contact springs 13. In other embodiments, the bight height 44 may equal the height of the apex 49.

Figure 3:
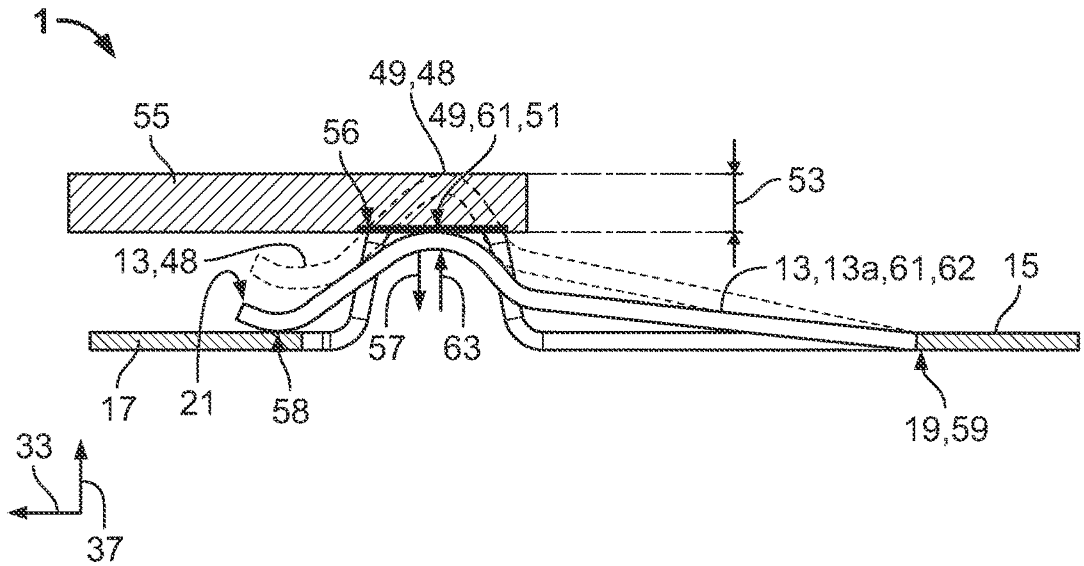
FIG. 3 is a sectional side view of the contact element contacting a mating contact.

FIG. 3 shows a partially cut side view of the contact element 1 which is in contact with a mating contact 55. The mating contact 55 may comprise a contact pad 56 or may be made entirely from a conductive material.

FIG. 3 only schematically shows how an electric connection is established. The mating contact 55 is moved opposite the length direction 33, thereby exerting a deflection force 57 onto the contact springs 13. The contact spring 13 is deflected, in particular pivoted about the pivot point 59 that corresponds to the fixed end 19.

First, the contact spring 13 is deflected towards gap 23 until the free end 21 of the contact spring 13 abuts the second region 17 of the frame 11 at a support point 58.

Depending on the mating contact 55 applied, the spring contact 13 may be further compressed opposite the height direction 37, which results in a compression of the curved shape of the contact spring 13, such that apex 49 is pressed towards the gap 23 and free end 21 is slightly dislocated in length direction 33.

Prior to this compression, the entire contact spring 13 may be tilted around pivot point or pivot line 59.

FIG. 3 schematically shows the contact spring 13 in the rest position 48 drawn with a dotted line as well as the deflection distance 53 mentioned above. The deflection distance 53 corresponds to the distance between a height position along the height direction 37 of apex 49 in the rest position 48 of the contact spring 13 and the height position of apex 49 in a compressed state 61 of the contact spring 13. The compressed state 61 of the contact spring 13 corresponds to a deflected position 62 of contact spring 13. In this deflected position 62, contact spring 13 is in mechanical contact with the second region 17 of frame 11.

Towards the free end 21 of the at least one contact spring 13, the deflection distance 53 increases as compared to a position closer to the fixed end 19. If the at least one contact spring 13 is deflected, i.e. pivoted around the fixed end 19 and the curved portion 46, the apex 49 in particular is slightly tilted because of this pivotal movement. However, the contact position is still defined by said apex 49 because it is not strongly dislocated in the length direction.

At least in the compressed state 61 (shown in FIG. 3), the free end 21 is in mechanical contact with the second region 17 and a contact force 63 is exerted by the contact spring 13 in height direction 37. The contact force 63 is oriented essentially normal to the mating contact 55 and may thus be referred to as normal contact force. The free end 21 of the at least one contact spring 13 abutting the second portion results in an increased contact force that may be exerted by the at least one contact spring 13 towards the mating contact member 55. The contact force 63 thus does not correspond to the force necessary to tilt the at least one contact spring 13 around the fixed end 19, but corresponds to the force necessary to bend, in particular compress the curved contact spring 13.

Exemplarily, the curved portion 46 of the contact spring 13 with the apex 49 is actually not displaced along or opposite the deflection direction towards the gap 23, i.e. a baseline of said curve remains constant and remains in the plane 9 of the frame 11, whereas the curved portion is compressed towards the gap 23, decreasing the height of the curved portion 46 and displacing the apex 49 towards the plane of the frame 11, wherein at the same time a width of the curved portion 46 is increased. The at least one spring member 13 is thus not deflected in a pivotal manner but in a compressing manner. Depending on the geometry and/or shape of the curved section 46, the possible contact forces obtained by deformation of the spring member 13 may be several times larger than possible contact forces obtained by pivotal deflection of the spring member 13. Said contact forces may be 2 to 20 times larger if the contact spring 13 is deformed. Further, an overbending of the contact spring 13 may be prevented.

Such a geometry and/or shape of the contact element 1 is easy to produce, store or transport. Such essentially flat contact elements 1 may comprise a tab connecting each of a plurality of contact elements 1 with a carrier strip for reeling said carrier strip and the contact elements 1 for easy transportation, storage or feeding in further processing steps.

Figure 4:
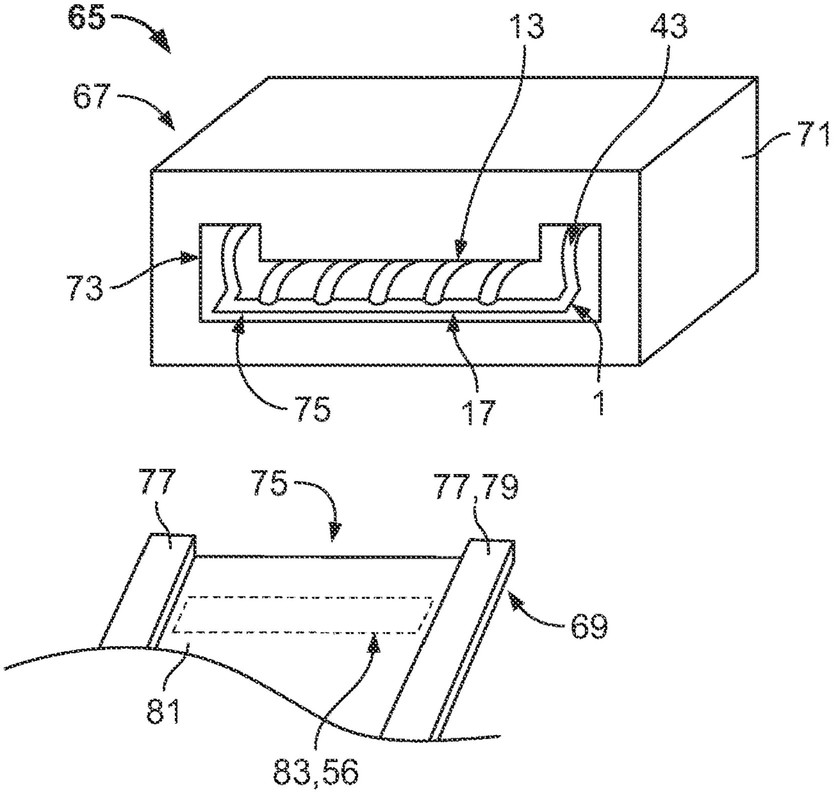
FIG. 4 is a perspective view of an electrical connector assembly according to an embodiment comprising an electrical connector and a mating connector.

In FIG. 4, an electrical connector assembly 65 is schematically shown. The electrical connector assembly 65 comprises an electrical connector 67 and a mating connector 69. Only in the embodiment shown the electrical connector represents a female connector and the mating connector a male connector. This may be different in other embodiments. In the electrical connector 67, any of the above contact elements 1 may be provided.

Figure 5:
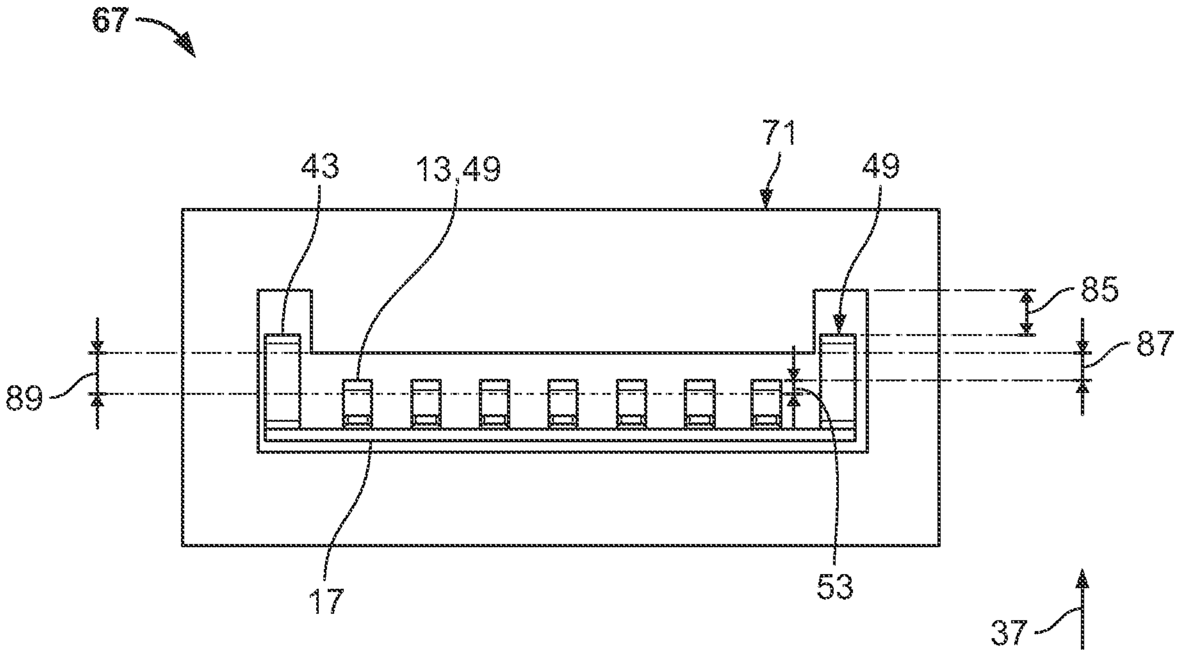
FIG. 5 is a front view of the electrical connector of FIG. 4.

The electrical connector 67 (which is also shown in FIG. 5 in a front view) comprises a connector housing 71 with a connection recess 73 provided in the connector housing 71. The connection recess 73 represents a connector face 75 of the electrical connector 67.

A contact element 1 is received in the connection recess 73. The contact element 1 may be inserted into the connector housing 71 via said connection recess 73 but may in other embodiments also be overmolded by the material of the connector housing 71. In any case, the contact element 1 is accessible via the connection recess 73.

The bights 43 and the contact springs 13 are also visible and accessible via the connection recess 73. The second region 17 of the contact element 1 is supported by the connector housing 71, such that contact springs 13 may be supported by the second region 17 without the second region 17 deflecting away from contact springs 13.

In an embodiment, the cross sections of the mating connector 69 and the connection recess 73 of the electrical connector 67 are complementary to one another. These cross sections may have orientation features that prevent the mating connector 69 from being connected to the electrical connector 67 in an incorrect orientation.

The mating connector 69 also has a connector face 75 that is essentially complementary to the connection recess 73. In the embodiment shown in FIG. 4, the mating connector 69 comprises two opposing guiding elements 77 that are longitudinal key elements 79.

A plate member 81 connects the opposing guiding elements 77 and provides a contact portion 83 that is located, respectively accessible from the lower side of the mating connector 69. The contact portion 83 is drawn with a dotted line. The contact portion 83 may be the contact pad 56 shown in FIG. 3.

The established electrical connection between contact portion 83 of the mating connector and contact springs 13 of the electrical connector 67 is indicated in FIG. 3.

In order to protect the at least one contact spring 13 against application of a force exceeding the maximum allowable force to be exerted onto the contact spring 13 (exceeding this threshold force may result in an overbending, permanent deformation or damage of the contact spring 13), a section of the mating connector 69, i.e. a portion of the mating connector housing or a portion of the mating contact 55 may abut the bight 43 or the pair of bights 43 of the contact element 1 provided in the electrical connector 67.

The bight 43 may support the mating connector 69, in particular, in a direction towards the frame 11 of the contact member. This may prevent unwanted movement of the mating contact of the mating connector 69 towards the frame. A deflection of the at least one contact spring 13 towards the gap 23 may therefore be determined only by the geometry of the mating contact. In particular, the height of the mating contact 55 may determine the amount of deflection of the at least one contact spring 13 towards the gap 23.

The electrical connector assembly 65 may be further improved by the contact element 1 comprising two opposing bights 43 that are configured to receive a portion of the mating connector 69 between the bights 43 and that are configured to guide a portion of the mating connector 69 during insertion of the mating connector 69 into the electrical connector 67.

A mating contact 55 may be a metallic or a metallized tab, wherein a width direction is oriented perpendicular to the length direction and the height direction may be equal or smaller than a distance between two bights 43 of the contact element 1. The bights 43 may thus form a receiving or guiding slot for the mating contact 55.

FIG. 5 shows a front view of the electrical connector 67. A free distance 85 between the bights 43 and the connector housing 71 determines how far the guiding elements 77 (see FIG. 4) may extend from plate member 81 in height direction 37. A lower side of the plate member 81 may abut the apex 49 of the bights 43.

In the rest position 48 of the contact springs 13, the corresponding apexes 49 are located at a further free distance 87 from the connector housing 71. In order to obtain a secure electric connection, the contact springs 13 are deflected towards the gap 23, i.e. opposite the height direction 37 for generating the necessary contact force 63 (see FIG. 3).

The plate member 81 of the mating connector 69 has a plate thickness 89 that determines the deflection distance 53. The deflection distance 53 is a difference of plate thickness 89 and the further free distance 87.

The above contact element 1, the electrical connector 67 and the electrical connector assembly 65 have the advantage of a simplified geometry and/or shape and/or structure and consequently of production costs as well as reducing the amount of material required for producing one contact element 1. Further, by providing an overlap between the free end 21 and the second region 17, the contact element 1 is configured to prevent overbending of the at least one contact spring 13 and to maintain or even increase a spring force that may be generated by the at least one contact spring 13.

What is claimed is:

1. A contact element, comprising:

a frame having a first region, a second region opposite the first region, and a third region connecting the first region and the second region, the second region is spaced apart from the first region by a gap, the third region has a bight; and a contact spring having a fixed end fixed to the first region of the frame and a free end opposite the fixed end, the contact spring extends from the first region across the gap to the second region, the bight is a folded section of the third region that shortens the third region such that the free end of the contact spring overlaps the second region.

2. The contact element of claim 1, wherein the frame is formed from a sheet metal.

3. The contact element of claim 1, wherein the bight extends in a direction along which the contact spring is elastically deflectable.

4. The contact element of claim 1, wherein the bight extends over a part of the third region and is closer to the second region than the first region.

5. The contact element of claim 1, wherein the contact spring is located at a same side of the frame as the bight.

6. The contact element of claim 1, wherein the contact spring extends from the frame to a height that is equal to a bight height that the bight extends from the frame.

7. The contact element of claim 1, wherein the contact spring is elastically deflectable from a rest position in a direction toward the gap.

8. The contact element of claim 7, wherein, in an elastically deflected position, the contact spring rests against the second region of the frame.

9. The contact element of claim 1, wherein the frame is arranged in a plane and the contact spring is elastically deflected perpendicular to the plane.

10. The contact element of claim 9, wherein the contact spring has a curved portion with an apex located at a height above the plane of the frame.

11. The contact element of claim 10, wherein the apex is closer to the free end of the contact spring than to the fixed end of the contact spring.

12. The contact element of claim 11, wherein the bight has a further curved portion with a further apex.

13. The contact element of claim 12, wherein the apex of the contact spring and the further apex of the bight are aligned along a length direction.

14. The contact element of claim 1, wherein the contact spring has a compressed state in which the contact spring is deflected toward the gap and the free end abuts the second region.

15. The contact element of claim 14, wherein the free end of the contact spring moves along the second region of the frame.

16. An electrical connector, comprising:

a connector housing having a connection recess; and a contact element received and held in the connector housing, the contact element is accessible via the connection recess and the contact element extends toward the connection recess, the contact element includes a frame and a contact spring, the frame has a first region, a second region opposite the first region, and a third region connecting the first region and the second region, the second region is spaced apart from the first region by a gap, the third region has a bight, the contact spring has a fixed end fixed to the first region of the frame and a free end opposite the fixed end, the contact spring extends from the first region across the gap to the second region, the bight is a folded section of the third region that shortens the third region such that the free end of the contact spring overlaps the second region.

17. An electrical connector assembly, comprising:

an electrical connector including a connector housing having a connection recess and a contact element received and held in the connector housing, the contact element is accessible via the connection recess and the contact element extends toward the connection recess, the contact element includes a frame and a contact spring, the frame has a first region, a second region opposite the first region, and a third region connecting the first region and the second region, the second region is spaced apart from the first region by a gap, the third region has a bight, the contact spring has a fixed end fixed to the first region of the frame and a free end opposite the fixed end, the contact spring extends from the first region across the gap to the second region, the bight is a folded section of the third region that shortens the third region such that the free end of the contact spring overlaps the second region; and a mating connector insertable into the electrical connector and forming an electric connection with the electrical connector, the mating connector has a cross section complementary to the connection recess.

18. The electrical connector assembly of claim 17, wherein the mating connector is supported by the bight which prevents movement of the mating connector toward the frame.

19. The electrical connector assembly of claim 18, wherein the bight is one of a pair of opposing bights of the contact element that receive a portion of the mating connector between the bights and guide the portion of the mating connector during insertion into the electrical connector.

* * * * *